D. DERR.
Car Brake.

No. 579, 31,583.

Patented Feb. 26, 1861.

Witnesses:

Inventor:
Daniel Derr

UNITED STATES PATENT OFFICE.

DANIEL DERR, OF BELLEFONTE, PENNSYLVANIA.

RAILROAD-CAR BRAKE.

Specification of Letters Patent No. 31,583, dated February 26, 1861.

*To all whom it may concern:*

Be it known that I, DANIEL DERR, of Bellefonte, in the county of Center and State of Pennsylvania, have invented certain new and useful Improvements in Car-Brakes; and I do hereby declare the following to be a full, clear, and exact description of the construction and operation of the same, reference being had to the accompanying drawings, making a part of this specification, in which—

Figure 1:
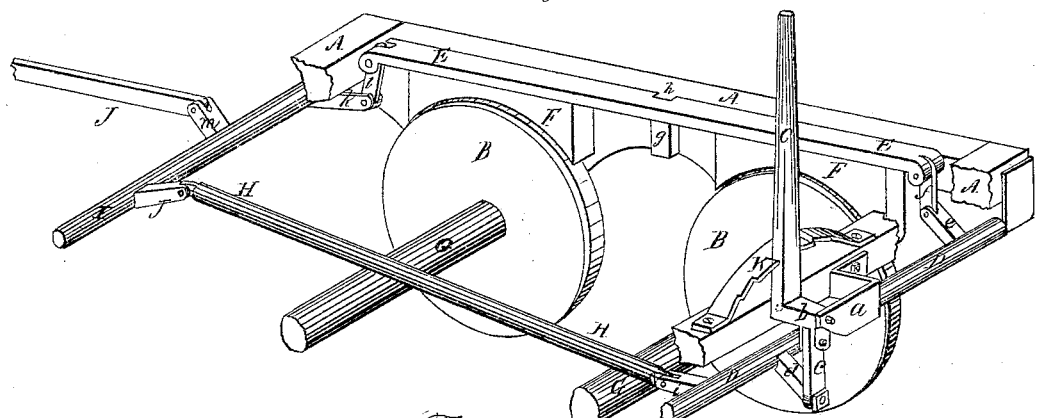
Figure 2:
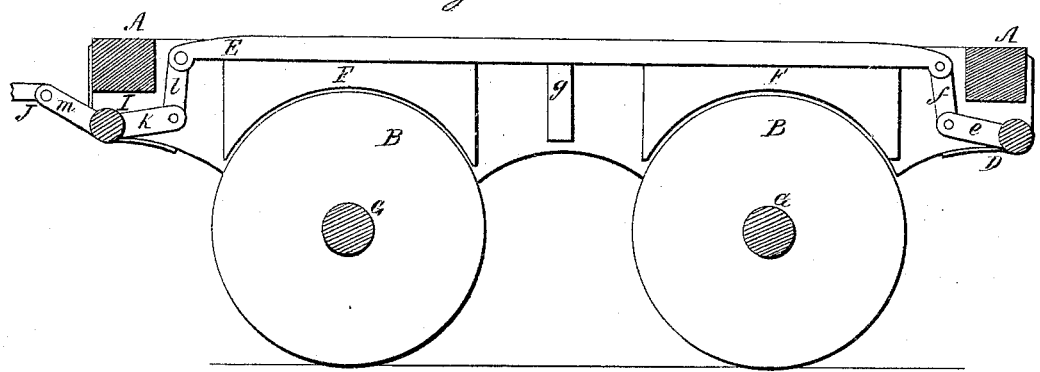
Figure 3:
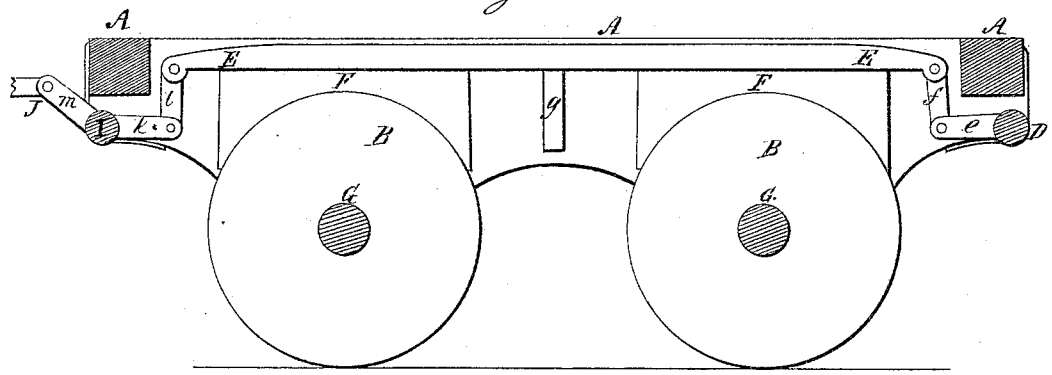

Figure 1 represents in perspective a broken section of one truck with the brake attached thereto, the same attachment being made to the other truck of the car. Fig. 2 represents a longitudinal vertical section through a truck, with the brake blocks up, or not in contact with the wheels, and the relative position of the several parts under this condition of the brake-blocks. Fig. 3 represents a similar section with the brake blocks down, or acting upon the wheels and the several relative positions of the parts under this condition of the brake-blocks.

Similar letters of reference where they occur in the separate figures, denote like parts of the brake, and truck to which it is applied in all the figures.

My invention relates to a speedy, cheap, and efficient manner of applying equal pressure to all the wheels of a car, whether it have one, two, or more trucks.

I am aware that, many arrangements of levers, rods, chains, and blocks, have been used in car-brakes, and that many attempts have been made to equalize the pressure upon all the wheels of the car or train—but without success as the lost motion, and more remoteness of some wheels from the applying power, than others, have heretofore baffled the skill of the best mechanics, and made this desirable result only an approximate one. I do not of course lay any claim to more than I have done toward making a perfect brake. But what I have done is beneficial and valuable whether it be much or little, and to that much I am entitled.

My invention consists in the construction and arrangement of the several parts composing my brake, as will be particularly mentioned in connection with the drawings accompanying this specification.

A, represents a truck frame, and B, the wheels thereof, made and supported in the usual manner. At one end of the truck frame is pivoted as at $a$, an L shaped lever C, to the short arm $b$ of which is pivoted one end of a link $c$—the other end of said link being pivoted to an arm $d$ that projects from a rock shaft D, supported by proper bearings in the truck frame, so as to be turned by the lever C, and its connections therewith.

At or near each end of the rock shaft D, are arms $e$, to which are attached respectively by the links $f$, brake-bars E, that carry brake-blocks F, placed immediately over the wheels B, so that the pressure upon the wheels shall come upon the rails, and not upon the journals of the axles G, as it does, when the pressure is applied in front or rear of the wheels. In order that the brake-bars E, may not get out of place, but work freely and truly, a rib $g$, is placed upon the inside of the longitudinal pieces of the truck frame, and a notch or gain $h$ cut in the brake-beams, so as to fit over and move upon said ribs, which act as guides therefor. On the rock shaft D, there is another projecting arm $i$, to which one end of a connecting rod H, is pivoted, the other end of said rod being similarly pivoted to a projecting arm $j$, on a rock shaft I located at the opposite end of the truck frame from that D. And the rock shaft I, has also upon it, arms $k$, which by means of links $l$, are connected to the other ends of the brake-beams, or bars E. The rock shaft I, carries also an arm $m$, to which is pivoted one end of a connecting rod or bar J, which extends to, and is connected with a rock shaft on the next truck, made arranged and operating, in all respects like those herein above described, and which consequently need not be shown in the drawing. By this arrangement of lever, rock shafts and close link, and rod or bar, connections, there is but the least possible lost motion, and hence the brake blocks need be moved but a very minute distance to bring them into and out of action. When flexible connections are used between the applying lever, and the brake blocks or wheels. it is impossible that the brakes should all come down at once, and with equal force owing to the amount of lost motion, while with my arrangement, the least motion of the lever C, is conveyed instantly and equitably to all the brake blocks connected with it.

A serrated arc or rack K, may be used for holding the lever, at such desired point as may be found desirable in its use.

Having thus fully described the nature and object of my invention, what I claim therein as new and desire to secure by Letters Patent, is—

In combination with the brake-bars, and blocks, arranged immediately over the tops of the wheels, the lever C, rock-shafts D, I, and connecting rod H, when united by the link and pivoted connections herein shown, and when arranged and operating as herein set forth.

DANIEL DERR.

Witnesses:
G. H. WEAVER,
H. I. DERR.